United States Patent
Murata

(10) Patent No.: US 7,823,550 B2
(45) Date of Patent: Nov. 2, 2010

(54) ENGINE EQUIPPED WITH ADJUSTABLE VALVE TIMING MECHANISM

(75) Inventor: Shinichi Murata, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 317 days.

(21) Appl. No.: 12/076,839

(22) Filed: Mar. 24, 2008

(65) Prior Publication Data

US 2009/0031973 A1 Feb. 5, 2009

(30) Foreign Application Priority Data

Jul. 30, 2007 (JP) ............... 2007-197946

(51) Int. Cl.
*F01L 1/34* (2006.01)
(52) U.S. Cl. .................. 123/90.15; 123/90.17; 123/347
(58) Field of Classification Search ............. 123/90.15, 123/90.17, 90.16, 90.18, 345, 346, 347, 348
See application file for complete search history.

(56) References Cited

U.S. PATENT DOCUMENTS

| 5,931,128 | A | 8/1999 | Murata et al. |
|---|---|---|---|
| 5,992,361 | A | 11/1999 | Murata et al. |
| 6,837,199 | B2 | 1/2005 | Matsuura et al. |
| 2004/0099244 | A1 | 5/2004 | Matsuura et al. |

FOREIGN PATENT DOCUMENTS

| JP | 55-69715 | 5/1980 |
|---|---|---|
| JP | 5-39756 A | 2/1993 |
| JP | 5-52240 A | 3/1993 |
| JP | 7-269381 | 10/1995 |
| JP | 7-269381 A | 10/1995 |
| JP | 7-324610 | 12/1995 |
| JP | 7-324610 A | 12/1995 |
| JP | 8-42381 A | 2/1996 |
| JP | 8-100662 | 4/1996 |
| JP | 8-100662 A | 4/1996 |
| JP | 8-218879 | 8/1996 |
| JP | 8-218879 A | 8/1996 |
| JP | 8-326548 | 12/1996 |
| JP | 8-326548 A | 12/1996 |
| JP | 10-220209 A | 8/1998 |
| JP | 10-318005 | 12/1998 |
| JP | 10-318005 A | 12/1998 |

(Continued)

*Primary Examiner*—Ching Chang
(74) *Attorney, Agent, or Firm*—Birch, Stewart, Kolasch & Birch, LLP

(57) ABSTRACT

An engine equipped with an adjustable valve timing mechanism includes: an inlet valve opening term varying mechanism, which is included in the adjustable valve timing mechanism, varying an opening term of an inlet valve; and an inlet valve opening term controller controlling the inlet valve opening term varying mechanism according to a running state of the engine, the inlet valve opening term varying mechanism setting the opening term of the inlet valve to an first inlet term while the engine runs at relatively high load and relatively high speed, the inlet valve opening term varying mechanism also setting the opening term of the inlet valve to a second inlet term, termination timing of the inlet valve opening of which is retarded compared to the termination timing of the inlet valve opening in the first inlet term, while the engine runs at relatively low load and relatively low speed.

16 Claims, 10 Drawing Sheets

FOREIGN PATENT DOCUMENTS

| | | |
|---|---|---|
| JP | 3094762 B2 | 8/2000 |
| JP | 3498784 A | 12/2003 |
| JP | 2004-068755 | 3/2004 |
| JP | 2004-68755 A | 3/2004 |
| JP | 2004-183513 | 7/2004 |
| JP | 2006-161633 | 6/2006 |
| JP | 2006-161633 A | 6/2006 |
| JP | 3834921 B2 | 8/2006 |

Exhaust Valve Lifting Characteristics
$L_{EO1}$ : High-load/ High-speed
$L_{EO2}$ : Low-load/ Low-speed
$L_{EO3}$ : High-load/ Low-speed Inlet Valve Lifting Characteristics
$L_{IO1}$ : High-load/ High-speed
$L_{IO2}$ : Low-load/ Low-speed
$L_{IO3}$ : High-load/ Low-speed

ENGINE EQUIPPED WITH ADJUSTABLE VALVE TIMING MECHANISM

BACKGROUND OF THE INVENTION

1. Field of the Invention

The present invention relates to an engine equipped with an adjustable valve timing mechanism preferably used in an automobile.

2. Description of the Related Art

There has been conventionally known a reciprocating engine (hereinafter simply called engine) which is used in an automobile and which is equipped with a mechanism to vary dynamic characteristics (valve lifting characteristics) of inlet valves and exhaust valves such as opening/closing timings, opening terms and lifting amounts.

This mechanism is called an adjustable valve timing mechanism, an example of which is disclosed in Patent Reference 1 below.

Patent Reference 1 discloses a technique to vary the valve lifting characteristic of the inlet valves and the exhaust valves according to the load and the speed of the engine with the intention of improvement in the fuel efficiency and the engine power.

[Patent Reference 1] Japanese Patent No. 3094762.

However, recent growth of interest in environmental protection demands further improvement in fuel efficiency, which the technique in Patent Reference 1 cannot satisfactorily provide. Further, even if the fuel efficiency is improved, decline in the engine output is unfavorable because the original convenience of automobiles would be impaired.

SUMMARY OF THE INVENTION

With the foregoing problems in view, the object of the present invention is to provide an engine equipped with an adjustable valve timing mechanism which makes it possible to realize the factors of both high fuel efficiency and high output of the engine.

To attain the above object, there is provided an engine equipped with an adjustable valve timing mechanism comprising: an inlet valve opening term varying mechanism, which is included in the adjustable valve timing mechanism, varying an opening term of an inlet valve; and an inlet valve opening term controller controlling the inlet valve opening term varying mechanism according to a running state of the engine, the inlet valve opening term varying mechanism setting the opening term of the inlet valve to a first inlet term while the engine runs at relatively high load and relatively high speed, the inlet valve opening term varying mechanism also setting the opening term of the inlet valve to a second inlet term, termination timing of the inlet valve opening of which is retarded compared to the termination timing of the inlet valve opening in the first inlet term, while the engine runs at relatively low load and relatively low speed.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DESCRIPTION OF THE PREFERRED EMBODIMENTS

Hereinafter, description will now be made in relation to an engine having an adjustable valve timing mechanism according to an embodiment of the present invention with reference to the accompanying drawings.

Figure 1:
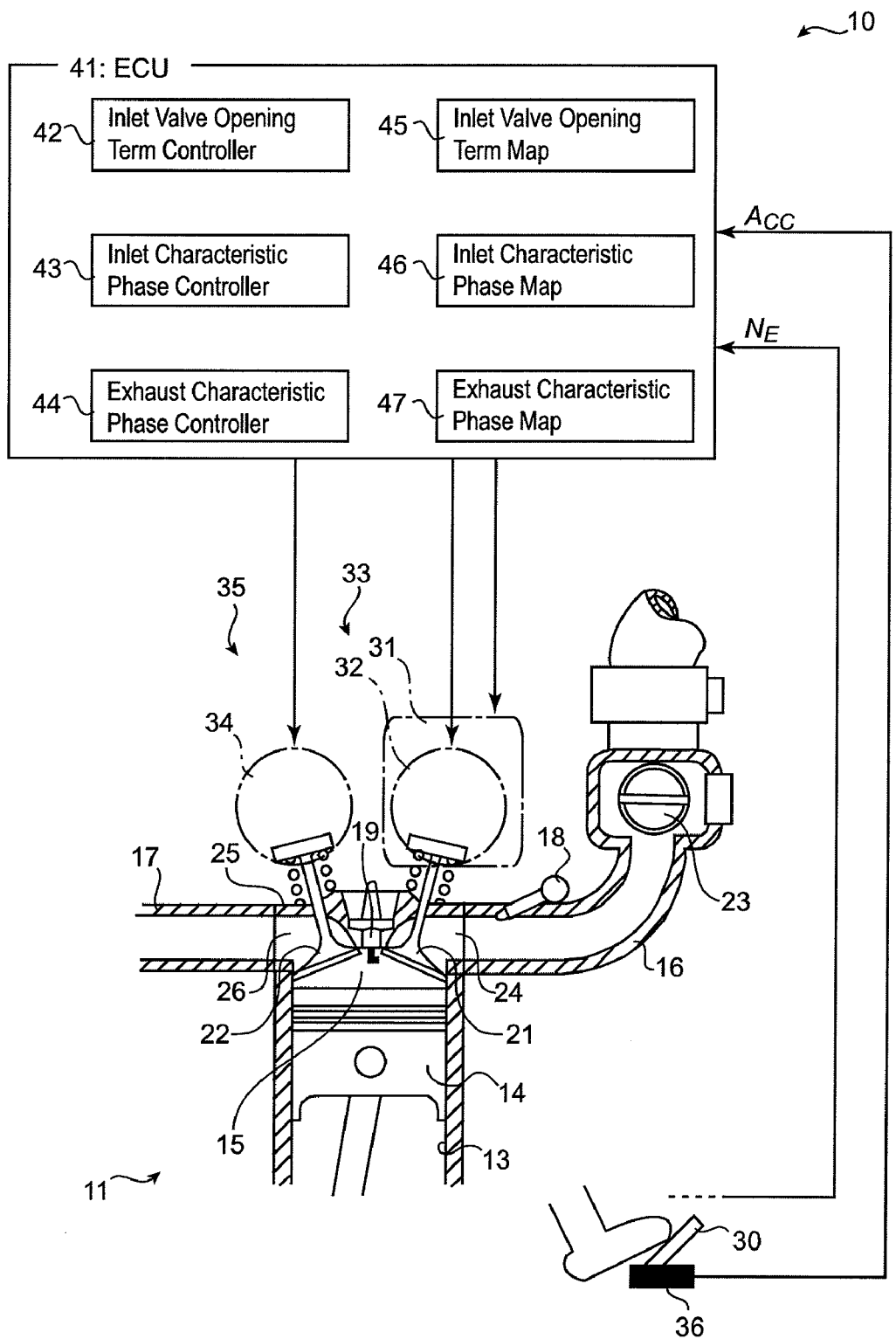
FIG. 1 is a block diagram schematically illustrating the entire configuration of a reciprocating engine equipped with an adjustable valve timing mechanism according to an embodiment of the present invention.

As shown in FIG. 1, reciprocating engine (engine) 11 is mounted in vehicle 10.

Piston 14 is positioned inside first cylinder 13 of engine 11, and combustion chamber 15 is formed above piston 14. For the sake of simplification here, only first cylinder 13 appears in the drawing, and this description focuses on first cylinder 13. Engine 11 is, however, a 4-cylinder engine and actually includes the unillustrated second to fourth cylinders.

Engine 11 further includes inlet manifold 16, exhaust manifold 17, fuel injector 18, sparking plug 19, inlet valve 21, and exhaust valve 22.

Inlet manifold 16 takes the form of a manifold to supply air taken from outside the vehicle to each of combustion chambers 15 of the first to the fourth cylinders. At the entrance on the inlet side of inlet manifold 16, there is installed throttle valve 23.

Exhaust manifold 17 takes the form of a manifold to connect each of combustion chambers 15 of the first to the fourth cylinders to a non-illustrated exhaust pipe, through which manifold exhaust gas from each combustion chamber is evacuated to the exhaust pipe.

Fuel injector 18 injects fuel into inlet port 24 in response to electric signals from fuel injection controller (not shown) in ECU (Electronic Control Unit) 41 that is to be detailed below. This fuel injector 18 can be substituted with a fuel injector which injects fuel into combustion chamber 15 (i.e., a fuel injector designed for a direct fuel-injection engine).

Sparking plug 19 is positioned on cylinder head 25 such that the end thereof projects inside combustion chamber 15, and is caused to spark inside combustion chamber 15 by high-tension electricity supplied from a non-illustrated ignition coil and thereby ignite an air-fuel mixture in combustion chamber 15. Sparking plug 19 is controlled by ECU 41.

Inlet valve 21, which moves in response to the movement of a non-illustrated inlet cam, opens and closes between inlet port 24 and combustion chamber 15.

Exhaust valve 22, which moves in response to the movement of a non-illustrated exhaust cam, opens and closes between exhaust port 26 and combustion chamber 15.

In addition, engine 11 includes inlet adjustable valve timing mechanism (adjustable valve timing mechanism) 33 which has inlet valve opening term varying mechanism 31 and inlet characteristic phase shifting mechanism 32, and exhaust adjustable valve timing mechanism (adjustable valve timing mechanism) 35 which has exhaust characteristic phase shifting mechanism 34.

Among the above mechanisms, inlet valve opening term varying mechanism 31 continuously varies the rotational speed of the inlet cam relative to the revolution speed of the crankshaft (not shown) and thereby continuously varies the length of the opening term (opening duration) $T_{IO}$ of inlet valve 21.

The configuration of inlet valve opening term varying mechanism 31 has been already known to the public, so description is omitted here. However, the techniques disclosed in Japanese Patent No. 3834921 and Japanese Patent Application Laid-Open (KOKAI) No. HEI 10-220209 are applied to the configuration.

Figure 2:
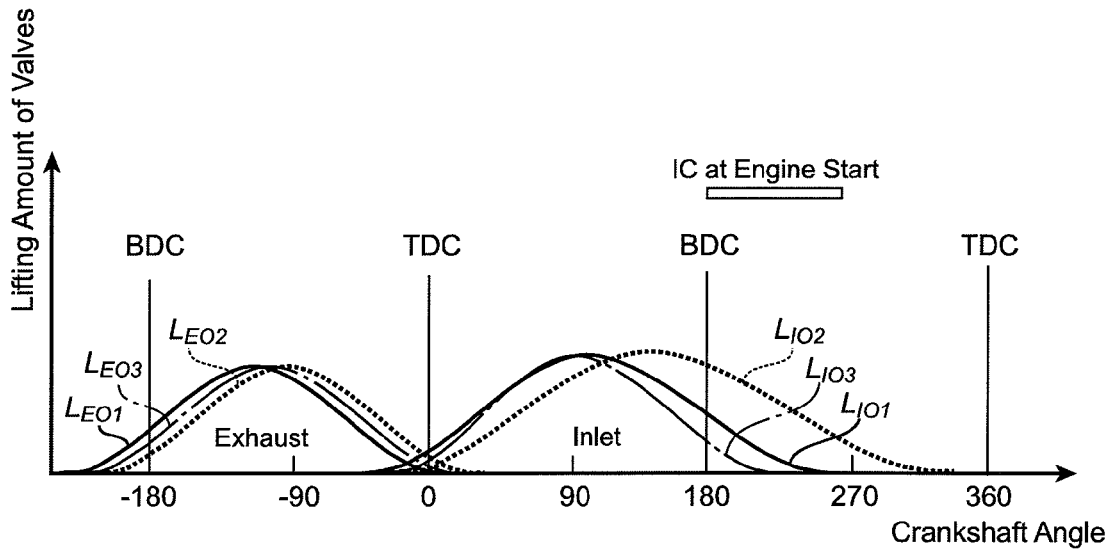
FIG. 2 is a graph (schematically) showing dynamic characteristics of an inlet valve and an exhaust valve of a reciprocating engine with the adjustable valve timing mechanism of FIG. 1.

Inlet characteristic phase shifting mechanism 32 shifts the phases $P_I$ of valve lifting characteristics $L_{IO1}$, $L_{IO2}$, $L_{IO3}$ of inlet valve 21 shown in FIG. 2.

Similarly, exhaust characteristic phase shifting mechanism 34 shifts the phases $P_E$ of valve lifting characteristics $L_{EO1}$, $L_{EO2}$, $L_{EO3}$ of exhaust valve 22 shown in FIG. 2.

Inlet valve lifting line $L_{IO1}$ represents the valve lifting characteristic of inlet valve 21 when engine 11 is in a high-load and high-speed running state; valve lifting line $L_{IO2}$ represents the valve lifting characteristic of inlet valve 21 when engine 11 is in a low-load and low-speed running state; and the valve lifting line $L_{IO3}$ represents the valve lifting characteristic of inlet valve 21 when engine 11 is in a high-load and low-speed running state.

Valve lifting line $L_{EO1}$ represents the valve lifting characteristic of exhaust valve 22 when engine 11 is in a high-load and high-speed running state; valve lifting line $L_{EO2}$ represents the valve lifting characteristic of exhaust valve 22 when engine 11 is in a low-load and low-speed running state; and valve lifting line $L_{EO3}$ represents the valve lifting characteristic of exhaust valve 22 when engine 11 is in a high-load and low-speed running state.

The configurations of inlet characteristic phase shifting mechanism 32 and exhaust characteristic phase shifting mechanism 34 have been already known to the public, so description thereof is omitted here. In the illustrated example, a technique disclosed in Japanese Patent No. 3498784 and other reference is used.

In addition, engine 11 includes an engine speed sensor (revolution speed sensor; not shown), accelerator sensor (accelerator pedal position sensor) 36, and ECU (Electronic Control Unit) 41.

The engine speed sensor detects the revolution speed $N_E$ of engine 11, and the result of the detection is read by ECU 41.

Accelerator sensor 36 detects an amount Acc of press of accelerator pedal 30, and the result of the detection is read by ECU 41.

ECU 41 includes an interface, a CPU, a memory and other elements, which however do not appear in the drawings. In the memory of ECU 41, software functioning as inlet valve opening term controller 42, inlet characteristic phase controller 43, and exhaust characteristic phase controller 44, and inlet valve opening term map 45, inlet characteristic phase map 46, and exhaust characteristic phase map 47 are stored.

Inlet valve opening term controller 42 controls inlet valve opening term varying mechanism 31 in accordance with the amount Acc of press of accelerator pedal 30 detected by accelerator sensor 36 and the engine speed $N_E$ detected by the engine speed sensor in order to vary opening term $T_{IO}$ of inlet valve 21.

Figure 3:
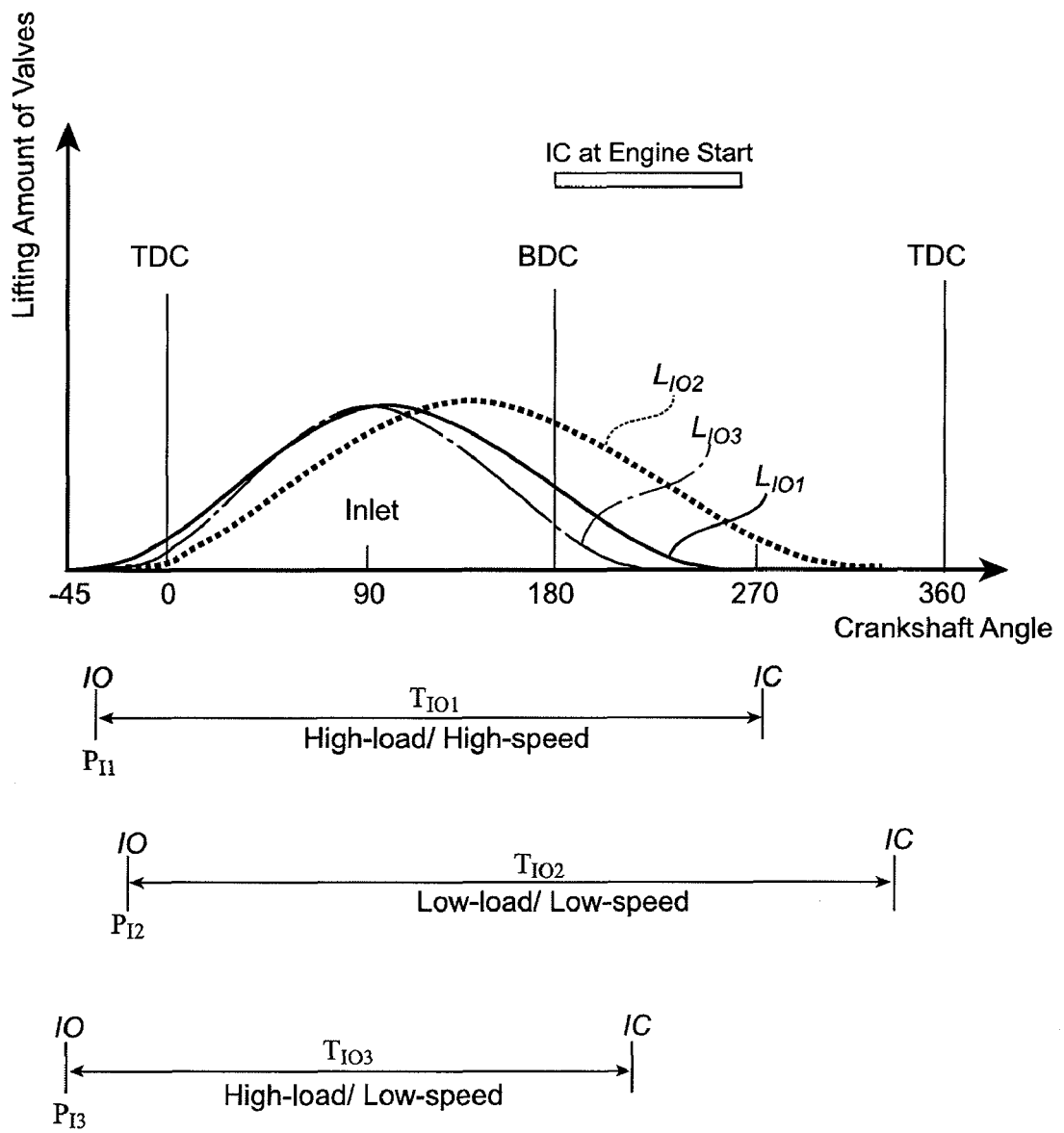
FIG. 3 is a graph (schematically) showing a dynamic characteristic of the inlet valve of a reciprocating engine with the adjustable valve timing mechanism of FIG. 1.

When engine 11 is in a high-load and high-speed running state, inlet valve opening term controller 42 sets the opening term $T_{IO}$ of inlet valve 21 to "first inlet term $T_{IO1}$", as shown in FIG. 3.

When engine 11 is in a low-load and low-speed running state, inlet valve opening term controller 42 sets the opening term $T_{IO}$ of inlet valve 21 to "second inlet term $T_{IO2}$".

When engine 11 is in a high-load and low-speed running state, inlet valve opening term controller 42 sets the opening term $T_{IO}$ of inlet valve 21 to "third inlet term $T_{IO3}$".

First inlet term $T_{IO1}$ is set to approximately |270°| CA (Crankshaft Angle); and second inlet term $T_{IO2}$ and third inlet term $T_{IO3}$ are set to approximately |300°| CA and |230°| CA, respectively.

Namely, inlet valve opening term controller 42 sets first inlet term $T_{IO1}$, second inlet term $T_{IO2}$ and third inlet term $T_{IO3}$ to establish the relationship of the below expression (1).

$$T_{IO3} < T_{IO1} < T_{IO2} \tag{1}$$

Figure 6:
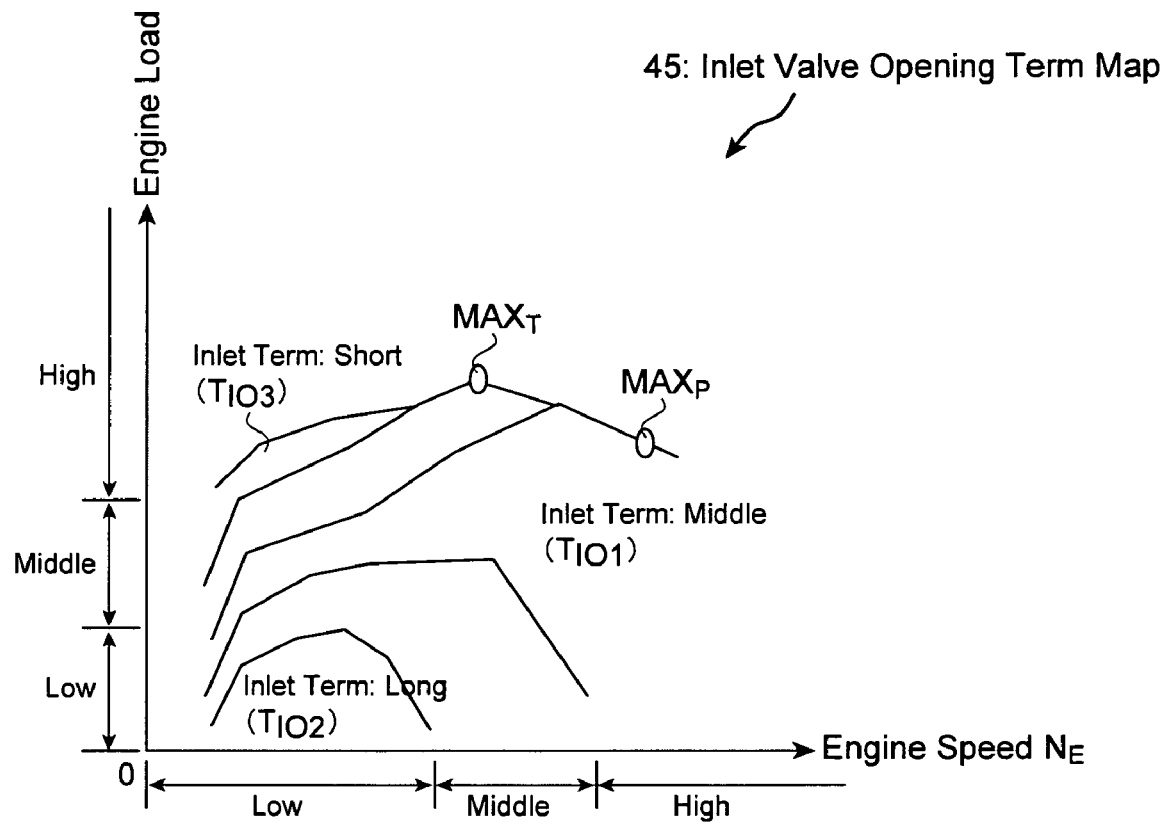
FIG. 6 is a graph schematically showing an inlet valve opening term map of a reciprocating engine with the adjustable valve timing mechanism of FIG. 1.

The relationship of inlet valve opening terms $T_{IO}$ of first inlet term $T_{IO1}$, second inlet term $T_{IO2}$ and third inlet term $T_{IO3}$ with an engine load and engine speed $N_E$ is defined by inlet valve opening term map 45 shown in FIG. 6.

In other words, inlet valve opening term controller 42 sets each inlet valve opening term $T_{IO}$ with reference to inlet valve opening term map 45.

FIG. 6 is notable for the inlet valve opening term $T_{IO}$ of inlet valve 21 when engine 11 is running at maximum power (i.e., maximum horse power, see "$MAX_P$" in FIG. 6) being set to first inlet term $T_{IO1}$.

In other words, inlet valve opening term controller 42 sets the opening term (fourth inlet term $T_{IO4}$, $T_{IO4}=T_{IO1}$ in this embodiment) of inlet valve 21 when the power of engine 11 is maximum to be shorter than second inlet term $T_{IO2}$.

Similarly, when engine 11 is running at maximum torque (see "$MAX_T$" in FIG. 6), the opening term $T_{IO}$ of inlet valve 21 is set to be shorter than first inlet term $T_{IO1}$. Accordingly, inlet valve opening term controller 42 sets an opening term of inlet valve 21 when engine 11 generates the maximum torque to be shorter than second inlet term $T_{IO2}$.

Inlet characteristic phase controller 43 controls inlet characteristic phase shifting mechanism 32 to shift the phases $P_I$ of valve lifting characteristics (valve lifting lines) $L_{IO1}$, $L_{IO2}$, and $L_{IO3}$ of inlet valve 21. Here, second inlet phase $P_{I2}$ and third inlet phase $P_{I3}$ are regarded as the retarded angle limit and the advanced angle limit, respectively, and first inlet phase $P_{I1}$ is regarded as the intermediate phase of these limits.

In other words, inlet characteristic phase controller 43 sets first inlet phase $P_{I1}$, second inlet phase $P_{I2}$, and third inlet phase $P_{I3}$ to establish the relationship of the below expression (2).

$$P_{I3} < P_{I1} < P_{I2} \tag{2}$$

Accordingly, as shown by valve lifting characteristic $L_{IO2}$ of inlet valve 21 in FIG. 3, if engine 11 is judged to be in a low-load and low-speed running state, inlet characteristic phase controller 43 sets the phase $P_I$ of the valve lifting line $L_{IO2}$ of inlet valve 21 to second inlet phase $P_{I2}$, which is regarded as the retarded angle limit, so that the termination timing IC of the opening of inlet valve 21 can be largely retarded, thereby realizing further excessive retarded closing of inlet valve 21.

Conversely, as shown by valve lifting characteristic $L_{IO3}$ of inlet valve 21, if engine 11 is judged to be in a high-load and low-speed running state, inlet characteristic phase controller 43 sets the phase $P_I$ of valve lifting line $L_{IO3}$ to third inlet phase $P_{I3}$, which is regarded as the advanced angle limit, so that the termination timing IC of the opening of inlet valve 21 can be largely advanced.

In addition, as shown by valve lifting characteristic $L_{IO1}$ of inlet valve 21, if engine 11 is judged to be in a high-load and high-speed running state, inlet characteristic phase controller 43 sets the phase $P_I$ of valve lift line $L_{IO1}$ of inlet valve 21 to first inlet phase $P_{I1}$, which is regarded as the intermediate angle or the advanced angle limit, so that the termination timing IC of the opening of inlet valve 21 is set.

Namely, inlet characteristic phase control can further enlarge the variation in termination timing IC of the opening of inlet valve 21.

Figure 7:
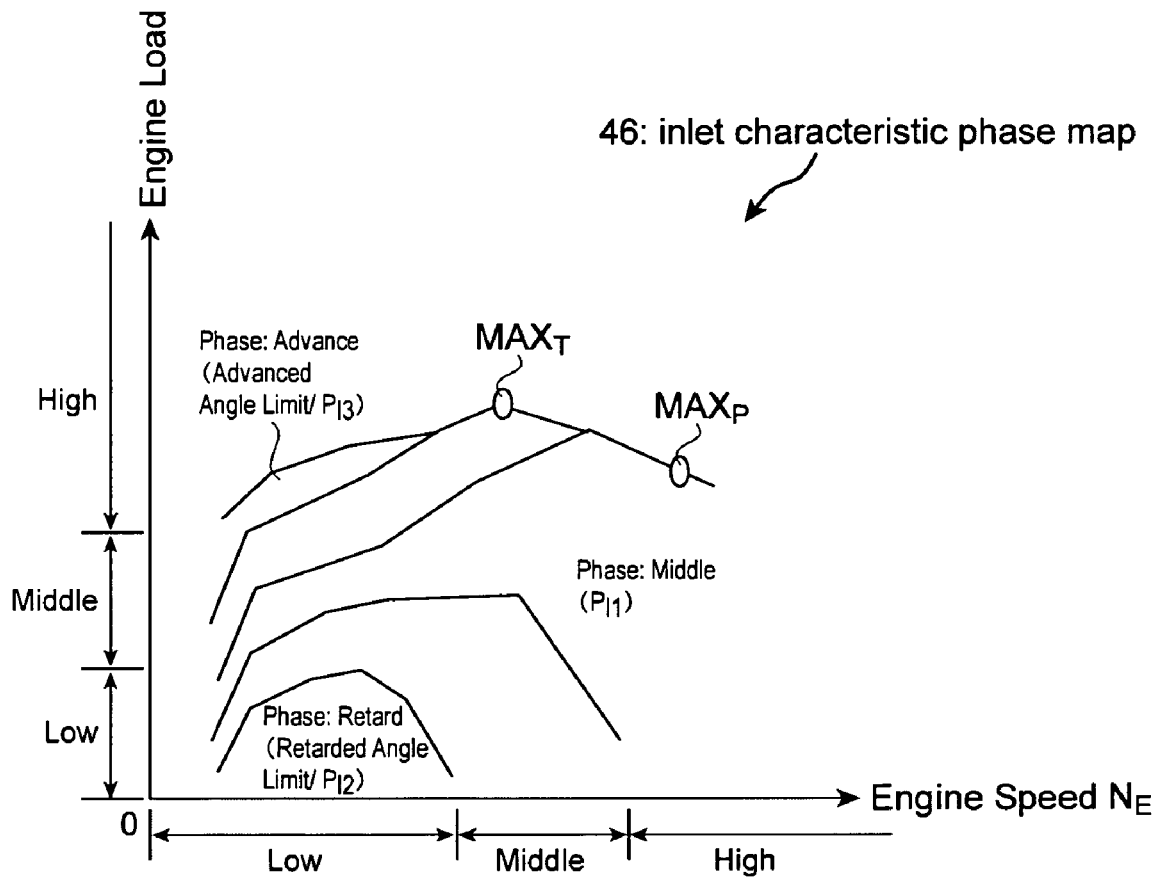
FIG. 7 is a graph schematically showing an inlet characteristic phase map of a reciprocating engine with the adjustable valve timing mechanism of FIG. 1.
Figure 8:
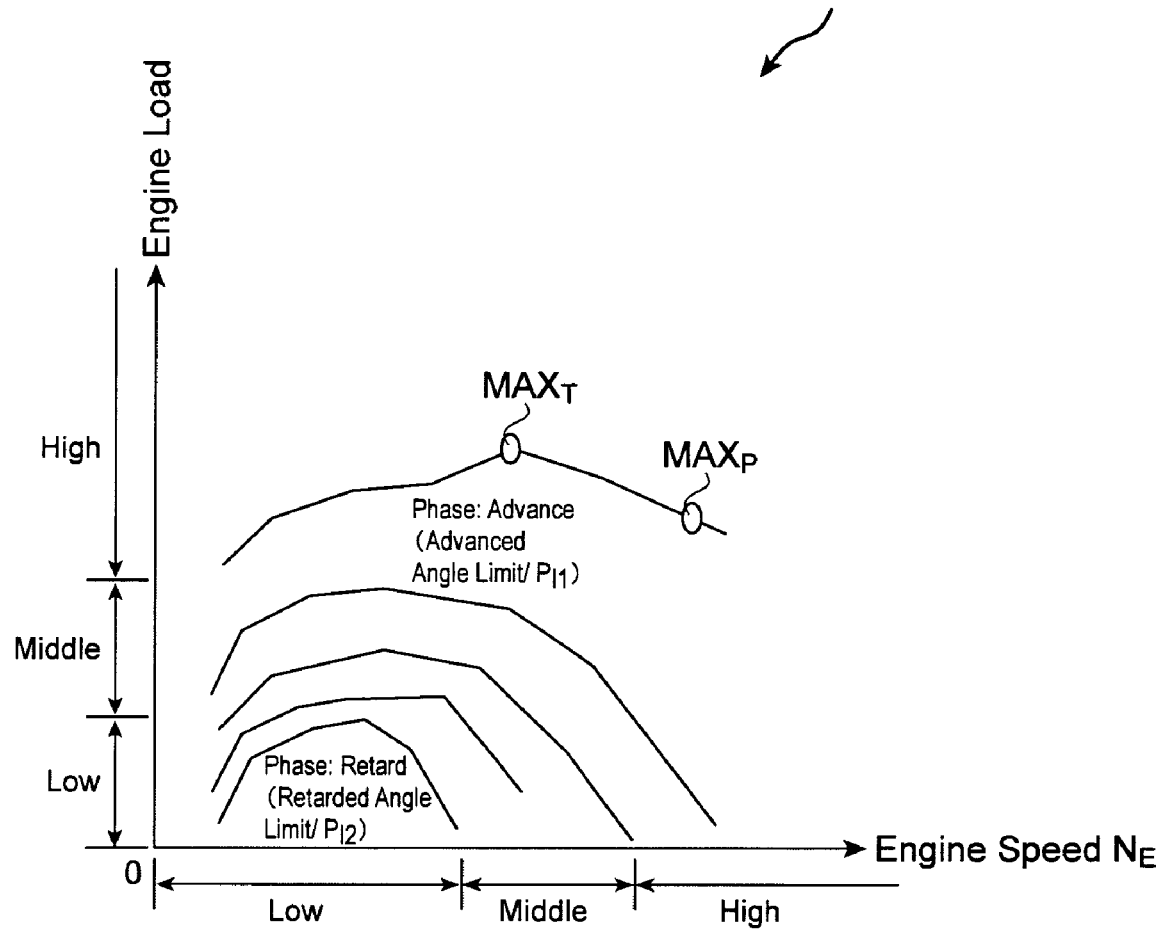
FIG. 8 is a graph schematically showing an inlet valve control map of a reciprocating engine with the adjustable valve timing mechanism of FIG. 1.
Figure 9:
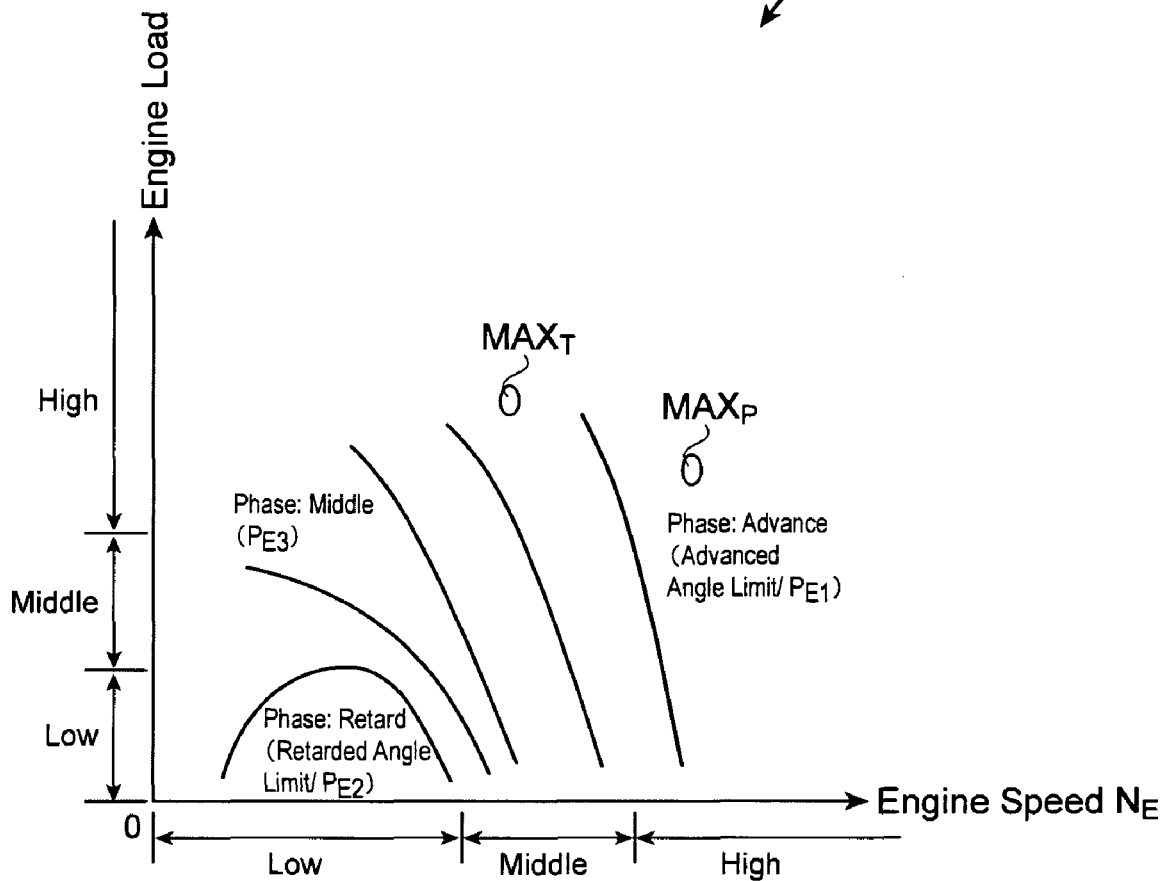
FIG. 9 is a graph schematically showing an exhaust characteristic control map of a reciprocating engine with the adjustable valve timing mechanism of FIG. 1.
Figure 10:
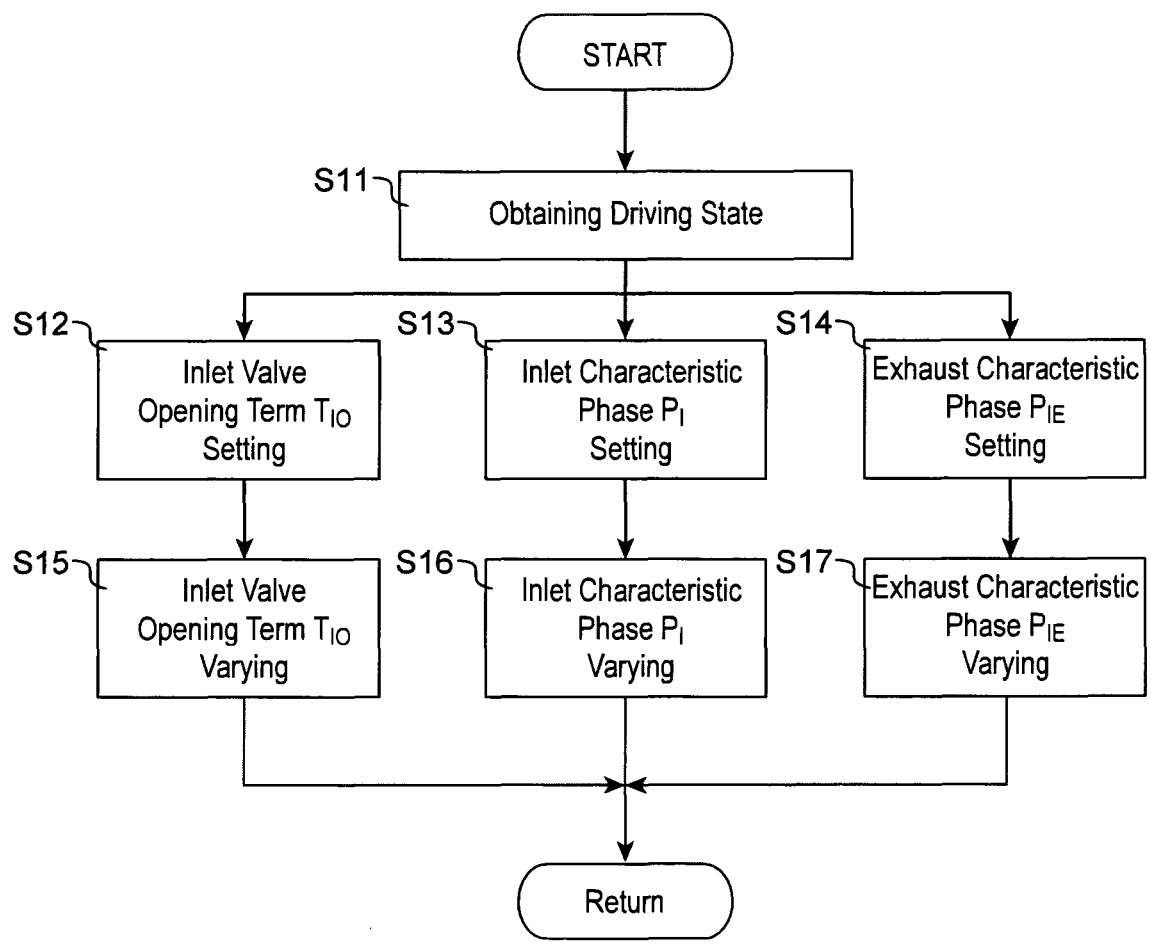
FIG. 10 is a flow diagram showing a succession of procedural steps of control performed in a reciprocating engine with the adjustable valve timing mechanism of FIG. 1.

As shown in FIGS. 7 and 8, first inlet phase $P_{I1}$, second inlet phase $P_{I2}$, and third inlet phase $P_{I3}$ that are phases of valve lifting lines $L_{IO1}$, $L_{IO2}$, and $L_{IO3}$ of inlet valve 21, respectively, are defined in inlet characteristic phase map 46 and/or exhaust characteristic phase map 47.

In other words, inlet characteristic phase controller 43 sets first inlet phase PIE, second inlet phase $P_{I2}$, and third inlet phase $P_{I3}$ that are phases of valve lift lines $L_{IO1}$, $L_{IO2}$, and $L_{IO3}$ of inlet valve 21, respectively with reference to inlet characteristic phase map 46 and/or exhaust characteristic phase map 47.

When an electric motor is functioning as a starter motor (that is, the engine is started), inlet characteristic phase controller 43 sets phase $P_I$ of the valve lifting characteristic of inlet valve 21 such that the termination timing IC of the opening of inlet valve 21 comes to be in the former half of the compression stroke (between +180° and +270° [CA]), which obtains compression pressure higher than the pressure required for ignition.

Exhaust characteristic phase controller 44 controls exhaust characteristic phase shifting mechanism 34 to shift the phases $P_E$ of valve lifting characteristic $L_{EO1}$, $L_{EO2}$, and $L_{EO3}$ of exhaust valve 22. Here, second exhaust phase $P_{E2}$ and first exhaust phase $P_{E1}$ are regarded as the retarded angle limit and the advanced angle limit, respectively, and third exhaust phase $P_{E3}$ is regarded as the intermediate phase.

Figure 4:
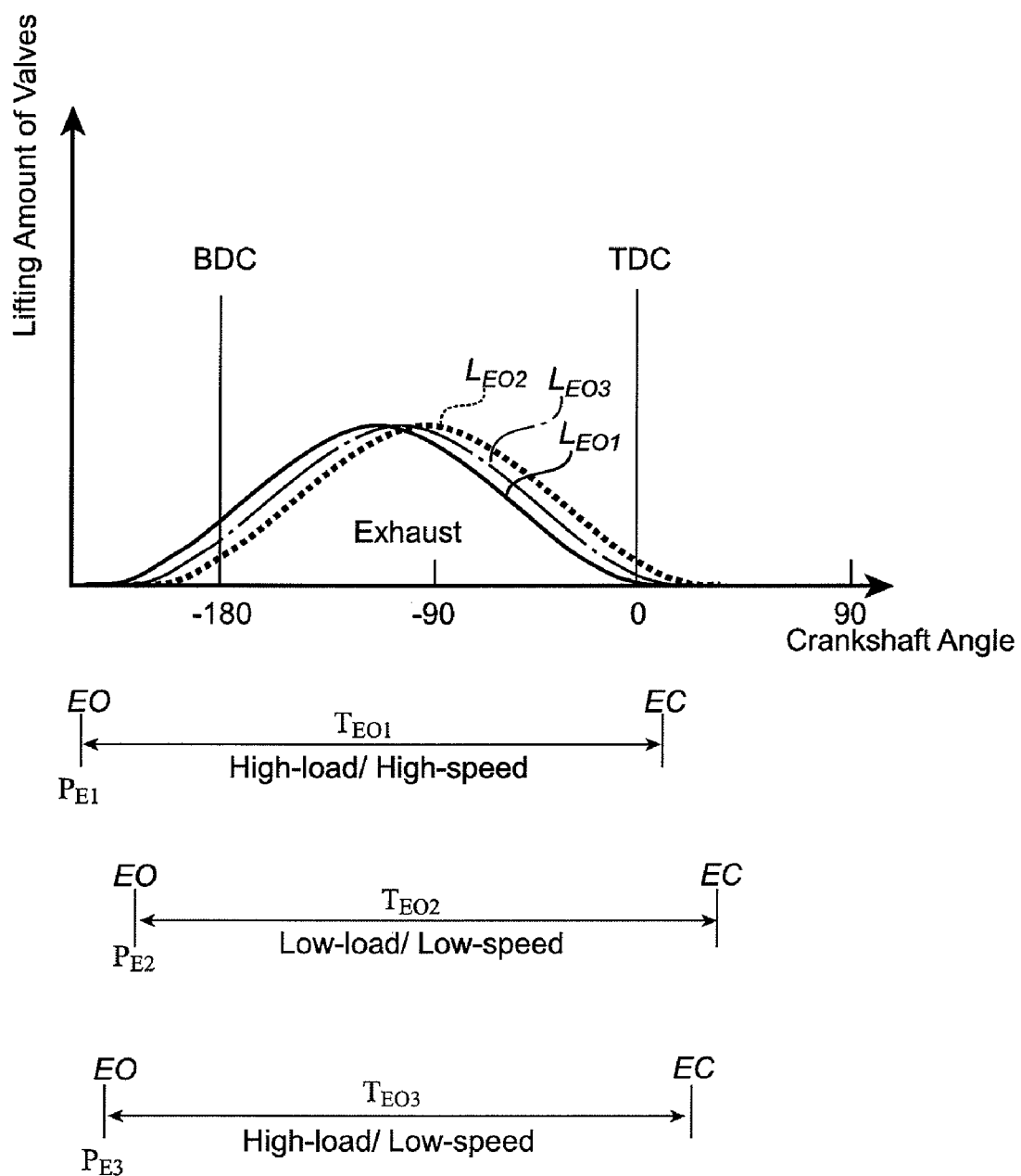
FIG. 4 is a graph (schematically) showing a dynamic characteristic of the exhaust valve of a reciprocating engine with the adjustable valve timing mechanism of FIG. 1.

As shown by valve lifting characteristics of exhaust valve 22 in FIG. 4, if engine 11 is judged to be in a high-load and high-speed running state, exhaust characteristic phase controller 44 sets the phase of valve lift line $L_{EO1}$ of exhaust valve 22 to first exhaust phase $P_{E1}$.

As shown by valve lifting characteristic $L_{E02}$ of exhaust valve 22, if engine 11 is judged to be in the running state of a low-load and low-speed running state, exhaust characteristic phase controller 44 sets the phase of valve lifting line $L_{EO2}$ of exhaust valve 22 to second exhaust phase $P_{E2}$.

In addition, as shown by valve lifting characteristic $L_{EO3}$ of exhaust valve 22, if engine 11 is judged to be in a high-load and low-speed running state, exhaust characteristic phase controller 44 sets the phase of valve lifting line $L_{EO3}$ of exhaust valve 22 to second exhaust phase $P_{E3}$.

In other words, exhaust characteristic phase controller 44 sets first exhaust phase $P_{E1}$, second exhaust phase $P_{E2}$, and third exhaust phase $P_{E3}$ to establish the relationship of the below expression (3).

$$P_{E1} < P_{E3} < P_{E2} \tag{3}$$

Differently from inlet valve 21, the opening term (opening duration) $T_{EO}$ of exhaust valve 22 is constant irrespective of the running state of engine 11. Namely, as shown in FIG. 4, exhaust first term $T_{EO1}$, exhaust second term $T_{EO2}$, and exhaust third term $T_{EO3}$ when engine 11 is in a high-load and high-speed running state, in a low-load and low-speed running state, and in a high-load and low-speed running state, respectively are set to be substantially equal as shown by the below expression (4).

$$T_{EO1} = T_{EO2} = T_{EO3} \tag{4}$$

In addition, inlet characteristic phase controller 43 and exhaust characteristic phase controller 44 set phase $P_I$ of the valve lifting characteristic of inlet valve 21 and phase $P_E$ of the characteristic of exhaust valve 22 to make an overlap term VOL, during which starting timing IO of inlet valve 21 and termination timing EC of the opening of exhaust valve 22 overlap.

Figure 5:
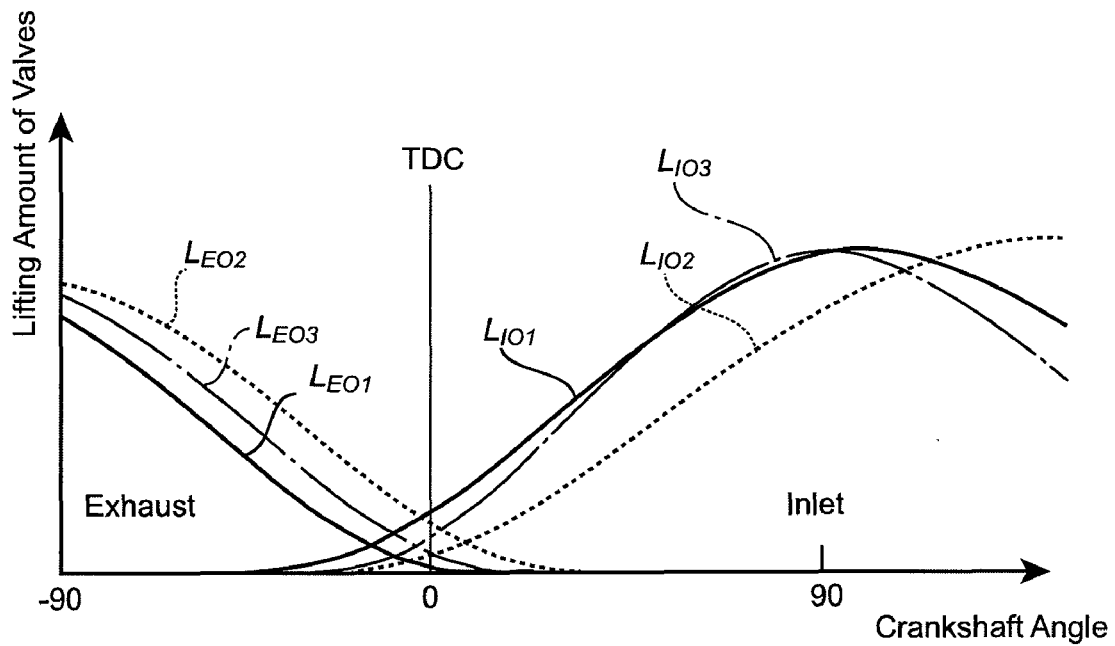
FIG. 5 is a graph (schematically) showing dynamic characteristics of the inlet valve and the exhaust valve of a reciprocating engine with the adjustable valve timing mechanism of FIG. 1, mainly showing the boundary between the exhaust stroke and the inlet stroke.

Specifically, while engine 11 is running at a high load and a high speed, inlet characteristic phase controller 43 and exhaust characteristic phase controller 44 respectively set first inlet phase $P_{I1}$ and first exhaust phase $P_{E1}$ to make first overlap term $VOL_1$ as shown in FIG. 5.

Further, while engine 11 is running at a low load and a low speed, inlet characteristic phase controller 43 and exhaust characteristic phase controller 44 respectively set second inlet phase $P_{I2}$ and second exhaust phase $P_{E2}$ to make second overlap term $VOL_2$.

Still further, while the engine is running at a high load and a low speed, inlet characteristic phase controller 43 and exhaust characteristic phase controller 44 respectively set third inlet phase $P_{I3}$ and third exhaust phase $P_{E3}$ to make third overlap term $VOL_3$.

In other words, inlet characteristic phase controller 43 and exhaust characteristic phase controller 44 set first overlap term $VOL_1$, second overlap term $VOL_2$, and third overlap term $VOL_3$ to establish the relationship of below expression (5).

$$VOL_2 < VOL_1 < VOL_3 \tag{5}$$

Here, focusing again on $MAX_P$ in FIGS. 6, 7, 8, and 9, even when engine 11 is running at maximum torque ($MAX_T$) or at maximum power ($MAX_P$), opening term $T_{IO}$, and phase PI of inlet valve 21, and opening term $T_{EO}$ of exhaust valve 22 are the same in the either case to be first inlet term $T_{IO1}$, first inlet phase $P_{I1}$, and first exhaust phase $P_{E1}$, respectively.

In other words, inlet characteristic phase controller 43 and exhaust characteristic phase controller 44 determine the overlap term (fourth overlap term $VOL_4$, in this embodiment, $VOL_4 = VOL_1$) at the time when engine 11 is running at maximum output torque to be shorter than second overlap term $VOL_2$.

An engine with adjustable valve timing mechanism according to this embodiment has the above configuration, which consequently provides the following advantages and effects.

Opening term $T_{IO}$ (i.e., second inlet term $T_{IO2}$) of inlet valve 21 when engine 11 is running at a low load and a low speed is set to be longer than opening term $T_{IO}$ (i.e., first inlet term $T_{IO1}$) of inlet valve 21 when engine 11 is running at a high load and a high speed.

Further, phase $P_I$ (i.e., second inlet phase $P_{I2}$) Of the valve lifting characteristic of inlet valve 21 when engine 11 is running at a low load and a low speed is set to be retarded compared to phase $P_I$ (i.e., first inlet phase $P_{I1}$) of the valve lifting characteristic of inlet valve 21 when engine 11 is running at a high load and a high speed.

Hence, the air filling efficiency of the inside combustion chamber 15 is improved by using supercharging effect caused by the inertia of inlet air flow while engine 11 is running at a high load and a high speed.

Since the exhaust phase advances, the resultant small VOL value enhances combustion efficiency, reducing EGR (Exhaust Gas Recirculation) inside. Although, the high-load and high-speed running state increases a the amount of exhaust gas, early opening timing of exhaust valve 22 smoothly emits the exhaust gas and decreases pumping loss in emission of the exhaust gas, which further improves the power of the engine.

When the engine 11 is running at a low load and a low speed, the termination timing IC of the opening of inlet valve 21 is greatly retarded (i.e., excessive retarded closing is realized) to greatly reduce the pumping loss. In other words, an amount of inlet air is adjusted by blowing back the air temporarily taken into the cylinder to inlet port 24, and the degree of opening of the throttle valve can be thereby increased, so that the pumping loss can be inhibited and fuel efficiency can be improved.

Further, since the phase $P_I$ of the valve lifting characteristic of inlet valve 21 is determined such that the start time IO of the opening of inlet valve 21 comes to be in the proximity of the starting timing of the intake stroke, the pumping loss in the early stage of the intake stroke can be inhibited.

Since the inlet air is warmed inside the cylinder, vaporization of liquid fuel adhered to and remained in inlet port 24 is enhanced and an amount of required air for requested torque is reduced according to the reduction in the pumping loss. Even under a state in which the actual compression rate declines, fuel combustion is improved to further enhance the fuel efficiency.

As a consequence, both high fuel efficiency and high power output can be realized at high levels.

The opening term $T_{IO}$ of inlet valve 21 when the power output of engine 11 becomes the maximum (i.e., fourth inlet term $T_{IO4}$=first inlet term $T_{IO1}$) is set in the same manner.

Since when engine 11 is started, phase $P_I$ of the valve lifting characteristic of inlet valve 21 is set such that the termination timing IC of the opening of inlet valve 21 is advanced to be within the range of from the bottom dead point to the former half of a compression stroke, it is possible to secure the pressure inside the combustion chamber required to start (ignite) engine 11 and to improve the performance to start (ignite) engine 11. In addition, since phase $P_I$ of the valve lifting characteristic of inlet valve 21 is consequently set to advance and the VOL is set to be relatively large, exhaust gas forcibly blows back into the inlet pipe when inlet valve 21 opens to blow liquid fuel adhering to inlet port 24, thereby causing the fuel to become fine particles and to be vaporized. Further, vaporization of the fuel is also promoted by heat from exhaust gases and consequently the amount of unburnt HC (hydrocarbons) is greatly reduced.

Opening term $T_{IO}$ (second inlet term $T_{IO2}$) of inlet valve 21 when engine 11 is running at a low load and a low speed is set to be longer than opening term $T_{IO}$ (third inlet term $T_{IO3}$) of inlet valve 21 when engine 11 is running at a high load and a low speed, and phase $P_I$ (second inlet phase $P_{I2}$) of the valve lifting characteristic of inlet valve 21 when engine 11 is running at a low load and a low speed is set to be retarded compared to phase $P_I$ (third inlet phase $P_{I3}$) of the valve lifting characteristic of inlet valve 21 when engine 11 is running at a high load and a low speed.

The above setting makes it possible to improve the efficiency of air filling inside combustion chamber 15 by using a supercharging effect caused by the inertia and the pulsing stream of inlet air flow when engine 11 is running at a high load and a low speed and to improve the effect caused by the reduction in pumping loss when engine 11 is running at a low load and a low speed.

Further, overlap term VOL (second overlap term $VOL_2$) when engine 11 is running at a low load and a low speed is set to be shorter than overlap term VOL (first overlap term $VOL_1$) when engine 11 is running at a high load and a high speed.

While engine 11 is running at a low load and a low speed, combustion stability is therefore improved by reduction in the amount of gas (so-called EGR gas) remaining in combustion chamber 15 after burning; and while engine 11 is running at a high load and a high speed, an increased amount of exhaust gases is smoothly emitted by advancing the opening timing of exhaust valve 22 and pumping loss in emission of the exhaust gas is inhibited, further increasing the output power of engine 11.

Valve overlap term VOL can be controlled by valve opening term $T_{IO}$ or phase $P_I$ of the valve lifting characteristic of inlet valve 21, but efficiency can be further enhanced by control based on phase $P_E$ of characteristics of exhaust valve 22.

One embodiment of the present invention is detailed as above, but the present invention should by no means be limited to the foregoing embodiment. Various changes and modifications can be suggested without departing from the sprit of the invention.

For example, each value of termination timing EC of exhaust valve 22, start timing IO of inlet valve 21, termination timing IC of inlet valve 21, opening term $T_{EO}$ of exhaust valve 22, opening term $T_{IO}$ of inlet valve 21, phase $P_E$ of characteristics of exhaust valve 22, phase $P_I$ of the valve lifting characteristics of inlet valve 21, and valve overlap term VOL can be varied within the scope of the present invention.

Further in the foregoing embodiment, the valve opening terms and the phases are set to constant values in association with the running states of a low, middle, or high load and a low, middle, or high speed, but alternatively may be values continuously varying with the torque and the engine speed.

From the invention thus described, it will be obvious that the same may be varied in many ways. Such variations are not regarded as a departure from the spirit and scope of the invention, and all such modifications as would be obvious to one skilled in the art are intended to be included within the scope of the following claims.

What is claimed is:

1. An engine equipped with an adjustable valve timing mechanism, comprising:
    an inlet valve opening term varying mechanism, which is included in said adjustable valve timing mechanism, varying an opening term of an inlet valve; and
    an inlet valve opening term controller controlling said inlet valve opening term varying mechanism according to a running state of the engine,
    said inlet valve opening term controller setting the opening term of the inlet valve to a first inlet term when the engine runs at a predetermined high load and a predetermined high speed,
    said inlet valve opening term controller also setting the opening term of the inlet valve to a second inlet term which is longer than the first inlet term,
        which has a starting timing of the inlet valve opening retarded compared to the starting timing of the inlet valve opening in the first inlet term, and has a termination timing of the inlet valve opening in the second inlet term retarded compared to the termination timing of the inlet valve opening in the first inlet term, when the engine runs at a predetermined low load, lower than the predetermined high load, and a predetermined low speed, slower than the predetermined high speed.

2. The engine equipped with the adjustable valve timing mechanism according to claim 1, wherein
said inlet valve opening term controller sets the opening term of the inlet valve to a third inlet term which is shorter than the first inlet term and which has a termination timing of the inlet valve opening advanced compared to the termination timing of the inlet valve opening in the first inlet term, when the engine runs at the predetermined high load and the predetermined low speed.

3. The engine equipped with the adjustable valve timing mechanism according to claim 2, wherein
said inlet valve opening term controller sets the termination timing of the inlet valve opening in a latter half of a compression stroke when the engine runs at the predetermined low load and the predetermined low speed.

4. The engine equipped with the adjustable valve timing mechanism according to claim 3, wherein
said inlet valve opening term controller sets the opening term of the inlet valve to a fourth inlet term shorter than the second inlet term, when the engine runs at maximum power.

5. The engine equipped with the adjustable valve timing mechanism according to claim 3, wherein
said inlet valve opening term controller sets the termination timing of the inlet valve opening in a former half of the compression stroke when the engine is started.

6. The engine equipped with the adjustable valve timing mechanism according to claim 5, wherein
said inlet valve opening term controller sets the opening term of the inlet valve to a fourth inlet term shorter than the second inlet term, when the engine runs at maximum power.

7. The engine equipped with the adjustable valve timing mechanism according to claim 2, further comprising:
an inlet characteristic phase shifting mechanism, included in said inlet valve timing mechanism, shifting a phase of a valve lifting characteristic of the inlet valve; and
an inlet characteristic phase controller controlling said inlet characteristic phase shifting mechanism, wherein
said inlet characteristic phase controller sets the phase of the valve lifting characteristic to a first inlet phase when the engine runs at the predetermined high load,
said inlet characteristic phase controller also sets the phase of the valve lifting characteristic to a second inlet phase, which is retarded compared to said first inlet phase, when the engine runs at the predetermined low load and the predetermined low speed.

8. The engine equipped with the adjustable valve timing mechanism according to claim 7, wherein
said inlet characteristic phase controller sets the phase of the valve lifting characteristic to a third inlet phase, which is advanced compared to said first inlet phase, when the engine runs at the predetermined high load and the predetermined low speed.

9. The engine equipped with the adjustable valve timing mechanism according to claim 8, wherein
said inlet valve opening term controller and said inlet characteristic phase controller set the phase of the valve lifting characteristic of the inlet valve so that the starting timing of the inlet valve opening is in proximity to the starting timing of an inlet stroke, when the engine runs at the predetermined low load and the predetermined low speed.

10. The engine equipped with the adjustable valve timing mechanism according to claim 9, wherein
said inlet valve opening term controller sets the opening term of the inlet valve to a fourth inlet term shorter than the second inlet term, when the engine runs at maximum power.

11. The engine equipped with the adjustable valve timing mechanism according to claim 8, wherein
said inlet valve opening term controller and said inlet characteristic phase controller set the phase of the valve lifting characteristic to make an overlap term, during which both the inlet valve and an exhaust valve are opening, to a first overlap term, when the engine runs at the predetermined high load and the predetermined high speed,
said inlet valve opening term controller and said inlet characteristic phase controller also set the overlap term to a second overlap term, which is longer than the first overlap term, when the engine runs at the predetermined low load and the predetermined low speed.

12. The engine equipped with the adjustable valve timing mechanism according to claim 11, wherein
said inlet valve opening term controller and said inlet characteristic phase controller set the overlap term to a fourth overlap term which is longer than the second overlap term, when the engine runs at maximum power.

13. The engine equipped with the adjustable valve timing mechanism according to claim 7, wherein
said inlet valve opening term controller and said inlet characteristic phase controller set the phase of the valve lifting characteristic of the inlet valve so that the starting timing of the inlet valve opening is in proximity to the starting timing of an inlet stroke, when the engine runs at the predetermined low load and the predetermined low speed.

14. The engine equipped with the adjustable valve liming mechanism according to claim 13, wherein
said inlet valve opening term controller sets the opening term of the inlet valve to a fourth inlet term shorter than the second inlet term, when the engine runs at maximum power.

15. The engine equipped with the adjustable valve timing mechanism according to claim 7, wherein
said inlet valve opening term controller and said inlet characteristic phase controller set the phase of the valve lifting characteristic to make an overlap term, during which both the inlet valve and an exhaust valve are opening, to a first overlap term, when the engine runs at the predetermined high load and the predetermined high speed,
said inlet valve opening term controller and said inlet characteristic phase controller also set the overlap term to a second overlap term, which is longer than the first overlap term, when the engine runs at the predetermined low load and the predetermined low speed.

16. The engine equipped with the adjustable valve timing mechanism according to claim 15, wherein
said inlet valve opening term controller and said inlet characteristic phase controller set the overlap term to a fourth overlap term which is longer than the second overlap term, when the engine runs at maximum power.

* * * * *